(12) United States Patent
Goto

(10) Patent No.: US 10,363,836 B2
(45) Date of Patent: Jul. 30, 2019

(54) SEATBACK FASTENING STRUCTURE, SEATBACK, AND FASTENING COMPONENT

(71) Applicant: TOYOTA BOSHOKU KABUSHIKI KAISHA, Aichi (JP)

(72) Inventor: Yuji Goto, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/952,851

(22) Filed: Apr. 13, 2018

(65) Prior Publication Data

US 2018/0297487 A1 Oct. 18, 2018

(30) Foreign Application Priority Data

Apr. 18, 2017 (JP) .................. 2017-081965

(51) Int. Cl.
*B60N 2/64* (2006.01)
*B60N 2/015* (2006.01)
*B60N 2/68* (2006.01)

(52) U.S. Cl.
CPC ............. *B60N 2/015* (2013.01); *B60N 2/643* (2013.01); *B60N 2/68* (2013.01)

(58) Field of Classification Search
CPC ........... B60N 2/015; B60N 2/643; B60N 2/68
USPC ......................................................... 296/63
See application file for complete search history.

(56) References Cited

U.S. PATENT DOCUMENTS

2009/0261636 A1* 10/2009 Jeong ...................... B60N 2/68
  297/216.13
2016/0152191 A1* 6/2016 Fukatsu ................. B60R 11/00
  297/188.04

FOREIGN PATENT DOCUMENTS

JP 2012-228971 11/2012

* cited by examiner

*Primary Examiner* — Joseph D. Pape
(74) *Attorney, Agent, or Firm* — Greenblum & Bernstein, P.L.C.

(57) ABSTRACT

One aspect of the present disclosure provides a seatback fastening structure for fastening a seatback to a body of a vehicle. A body bracket includes a main body portion covered by a seat bracket. The main body portion includes a receiving surface, an upper surface extending from a vertical upper end of the receiving surface, and a first lateral surface and a second lateral surface extending from both ends of the receiving surface in a width direction. The seat bracket includes a base portion covering the receiving surface, a retaining portion retaining the upper surface from vertically above, a first side wall and a second side wall respectively abutting on the first lateral surface and the second lateral surface. The main body portion and the base portion are fastened with a bolt.

5 Claims, 6 Drawing Sheets

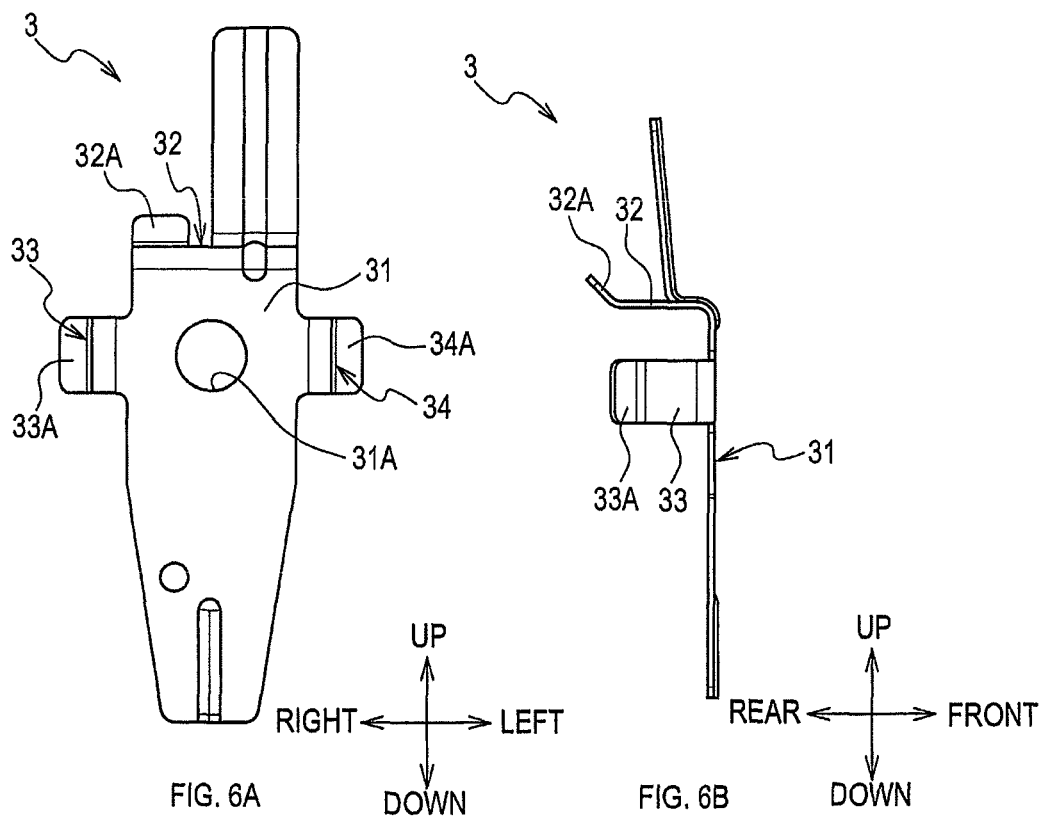
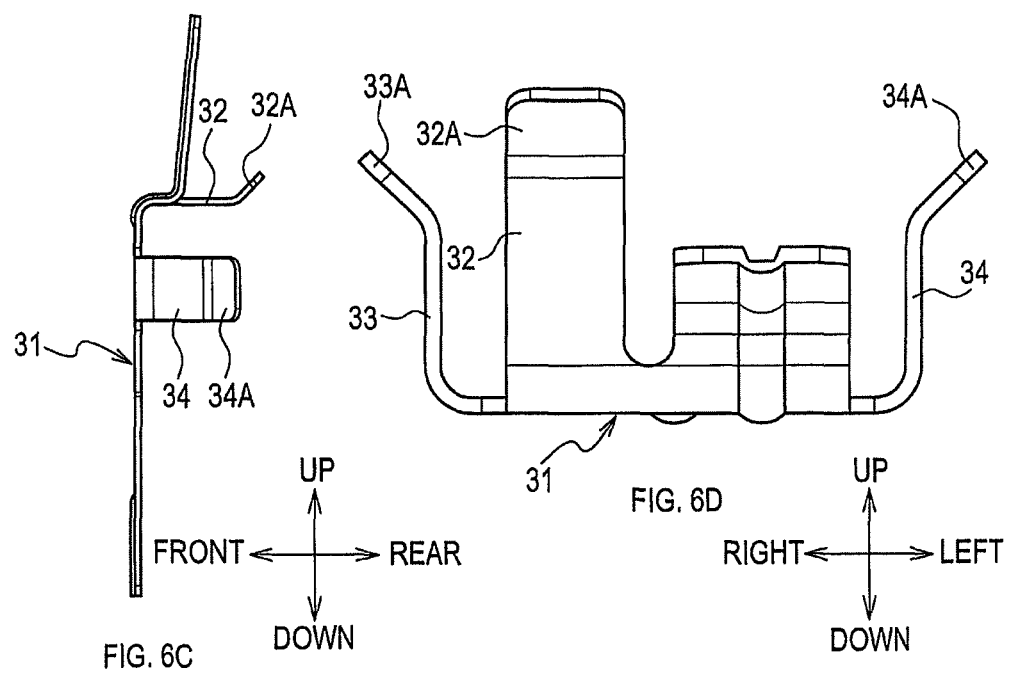

SEATBACK FASTENING STRUCTURE, SEATBACK, AND FASTENING COMPONENT

CROSS-REFERENCE TO RELATED APPLICATIONS

The present disclosure claims the benefit of Japanese Patent Application No. 2017-081965 filed on Apr. 18, 2017 with the Japan Patent Office, and the entire disclosure of which is incorporated herein by reference.

BACKGROUND

The present disclosure relates to a seatback fastening structure, seatback, and a fastening component.

In a vehicle seat that is arranged, for example, as a rear seat of an automobile, a seatback of the seat may be attached to a partition panel that divides a part of the body of the automobile into a cabin and a trunk.

In Japanese Unexamined Patent Application Publication No. 2012-228971, for example, a seatback is attached to a body such that a seat bracket provided to a back frame of the seatback covers a body bracket provided to the body, and these brackets are fastened with bolts and nuts.

SUMMARY

When a seatback is attached to a body, the position of a seat bracket is determined by the position of a body bracket secured to a body, and then the brackets are fastened with bolts. However, the seat bracket and the body bracket cannot be easily seen by a worker holding the seatback. Thus adjusting the positions of the brackets takes time and the work efficiency decreases.

To reduce the workload for adjusting the positions of such brackets, enlarging the diameters of holes provided to the brackets for inserting the bolts may be conceivable so that the positioning can be easy. In this case, however, the strength of the brackets may not suffice.

It is preferable that one aspect of the present disclosure provides a seatback fastening structure that improves the work efficiency for attaching a seatback to a body of a vehicle.

One aspect of the present disclosure provides a seatback fastening structure for fastening a seatback to a body of a vehicle. The structure comprises at least one body bracket fastened to the body, and at least one seat bracket having a planar shape and fastened to a vertical upper portion of a back frame forming a framework of the seatback. The at least one body bracket comprises a main body portion covered by the at least one seat bracket. The main body portion comprises a receiving surface facing the seatback, an upper surface extending from a vertical upper end of the receiving surface toward the body, and a first lateral surface and a second lateral surface extending from both ends of the receiving surface in a width direction of the seatback toward the body. The at least one seat bracket comprises a base portion covering the receiving surface of the main body portion, a retaining portion retaining the upper surface of the main body portion from vertically above, a first side wall abutting on the first lateral surface of the main body portion while the base portion covers the receiving surface, and a second side wall abutting on the second lateral surface of the main body portion while the base portion covers the receiving surface. The main body portion and the base portion are fastened with a bolt penetrating the main body portion and the base portion.

In this structure, the retaining portion, the first side wall, and the second side wall of the at least one seat bracket serve as guides in the up-down direction and the left-right direction when the at least on seat bracket is assembled with the at least one body bracket. This structure thus allows easier positioning of the at least one seat bracket and the at least one body bracket relative to each other even if a worker does not have a good view of the at least one seat bracket and the at least one body bracket, which in turn improves the efficiency in installing the seatback.

According to one aspect of the present disclosure, the first side wall and the second side wall may respectively comprise planar guide portions at tips located toward the body such that the planar guide portions are away from the base portion in the width direction of the seatback. This structure further facilitate easier positioning of the at least one seat bracket relative to the at least one body bracket.

In one aspect of the present disclosure, the at least one body bracket fastened to the body may be at least two body brackets. At least one seat auxiliary bracket may be fastened to the vertical upper portion of the back frame in addition to the at least one seat bracket. The at least one seat auxiliary bracket may comprise a base portion covering the receiving surface of the main body portion and a retaining portion retaining the upper surface of the main body portion from vertically above. The at least one seat auxiliary bracket may be configured to be movable in the width direction of the seatback while the retaining portion of the at least one seat auxiliary bracket retains an upper surface of one of the at least two body brackets. In this structure, only the at least one seat bracket comprises guides for positioning in the left-right direction relative to the at least two body brackets, whereas the at least one seat auxiliary bracket does not have such guides. This structure allows easier positioning of the at least one seat bracket in the left-right direction, and spontaneous positioning of the at least one seat auxiliary bracket in association with the positioning of the at least one seat bracket in the left-right direction. As a result, the efficiency in installing the seatback is further improved.

Another aspect of the present disclosure provides a seatback configured to be secured to a body of a vehicle to which at least one body bracket is fastened. The seatback comprises at least one seat bracket configured to be fastened to a vertical upper portion of a back frame forming a framework of the seatback. The at least one seat bracket comprises a base portion, a retaining portion, a first side wall, and a second side wall. The base portion configured to cover a receiving surface of the at least one body bracket facing the seatback. The base portion comprises a bolt inserting hole configured to be in communication with a bolt inserting hole of the receiving surface while the base portion covers the receiving surface. The retaining portion configured to retain an upper surface of the at least one body bracket from vertically above. The upper surface extends from a vertical upper end of the receiving surface toward the body. The first side wall configured to abut on a first lateral surface of the at least one body bracket while the base portion covers the receiving surface. The first lateral surface extends from a first end of the receiving surface in the width direction of the seatback toward the body. The second side wall configured to abut on a second lateral surface of the at least one body bracket while the base portion covers the receiving surface. The second lateral surface extends from a second end of the receiving surface in the width direction of the seatback toward the body.

This structure allows easier positioning of the at least one seat bracket and the at least one body bracket relative to each other even if a worker does not have a good view of the at least one seat bracket and the at least one body bracket. As a result, the efficiency in installing the seatback is improved.

Still another aspect of the present disclosure provides a fastening component for fastening a seatback to a body of a vehicle. The component comprises at least one body bracket configured to be fastened to the body, and at least one seat bracket configured to be fastened to a vertical upper portion of a back frame forming a framework of the seatback. The at least one body bracket comprises a main body portion configured to be covered by a seat bracket. The main body portion comprises a receiving surface, an upper surface, a first lateral surface, and a second lateral surface. The receiving surface is configured to face the seatback. The receiving surface comprises a bolt inserting hole. The upper surface extends from a vertical upper end of the receiving surface toward the body. The first lateral surface and a second lateral surface extend from both ends of the receiving surface in a width direction of the seatback toward the body. The at least one seat bracket comprises a base portion, a retaining portion, a first side wall, and a second side wall. The base portion is configured to cover the receiving surface of the main body portion and comprises a bolt inserting hole configured to be in communication with a bolt inserting hole of the receiving surface while the base portion covers the receiving surface. The retaining portion is configured to retain the upper surface of the main body portion from vertically above. The first side wall is configured to abut on the first lateral surface of the main body portion while the base portion covers the receiving surface. The second side wall is configured to abut on the second lateral surface of the main body portion while the base portion covers the receiving surface.

This structure thus allows easier positioning of the at least one seat bracket and the at least one body bracket relative to each other even if a worker does not have a good view of the at least one seat bracket and the at least one body bracket. As a result, the efficiency in installing the seatback is improved.

BRIEF DESCRIPTION OF THE DRAWINGS

An example embodiment of the present disclosure will be described hereinafter by way of example with reference to the accompanying drawings, in which.

Figure 3:
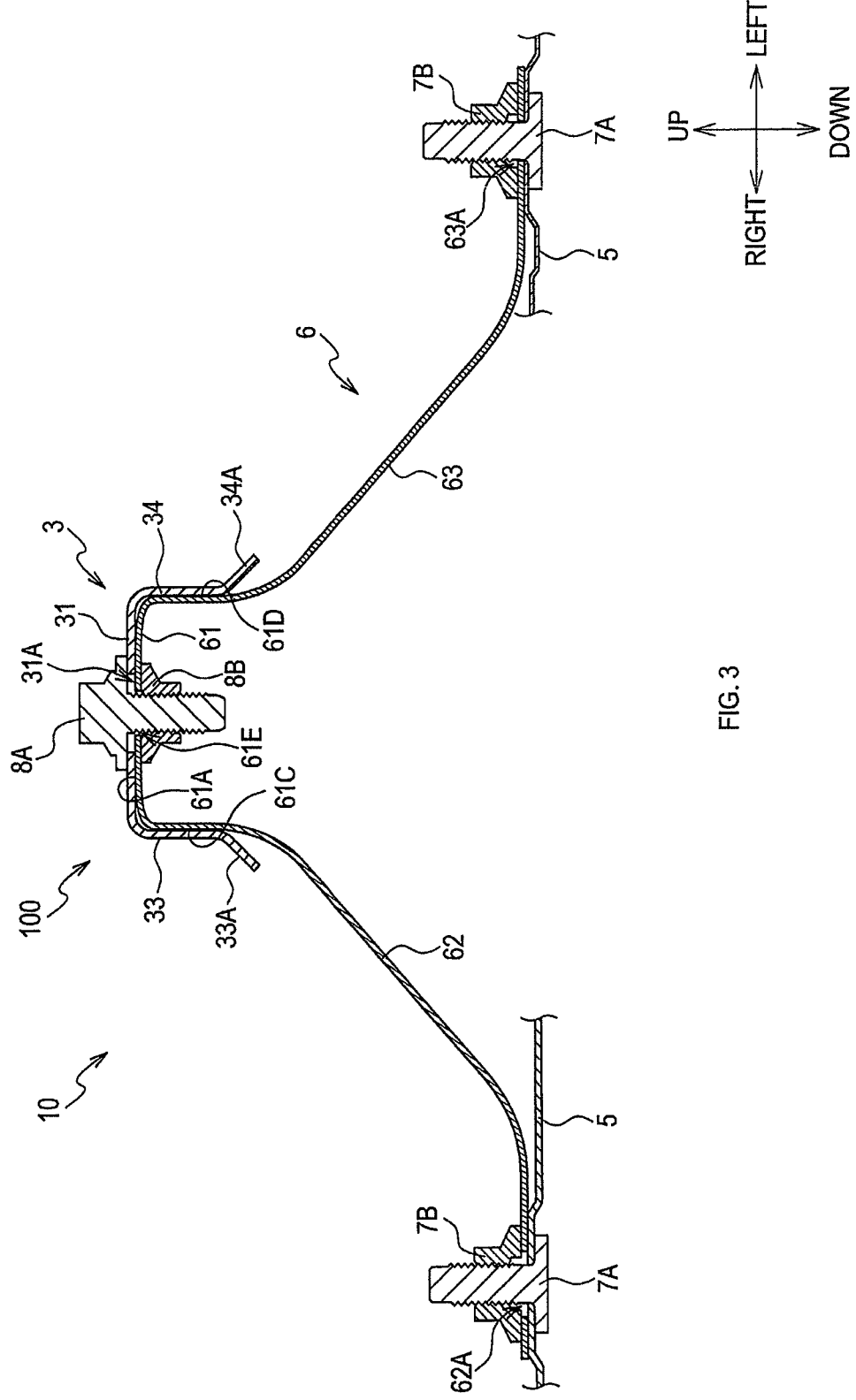
FIG. 3 is a schematic sectional view showing a seatback fastening structure and a fastening component according to the embodiment.

FIG: 5B is a schematic perspective view showing the body bracket from above;

FIG. 6A is a front view showing a seat bracket in the seatback fastening structure in FIG. 3;

FIG. 6B is a right side view showing the seat bracket;

FIG. 6C is a left side view showing the seat bracket; and

FIG. 6D is a top view showing the seat bracket.

DETAILED DESCRIPTION OF THE PREFERRED EMBODIMENTS

1. First Embodiment

[1-1. Structure]

Figure 1:
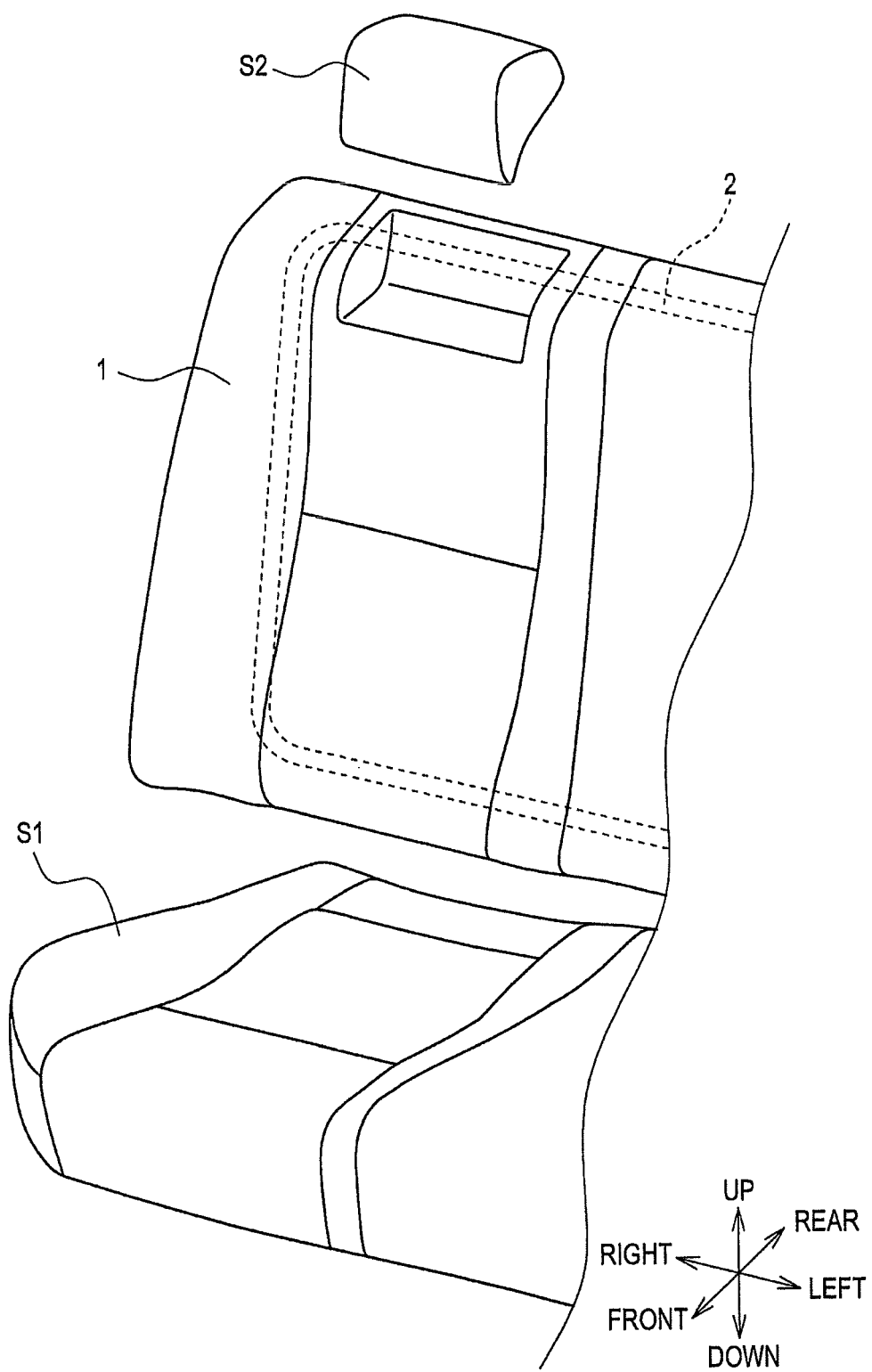
FIG. 1 is a schematic perspective view showing a seatback according to an embodiment of the present disclosure from the front side.

A seatback 1 shown in FIG. 1 forms a vehicle seat together with a seat cushion S1 and a headrest S2.

The seatback 1 is configured to support the back of an occupant. The seat cushion S1 is configured to support, for example, the buttocks of the occupant. The headrest S2 is configured to support the head of the occupant. The headrest S2 is attached to the seatback 1.

Figure 2:
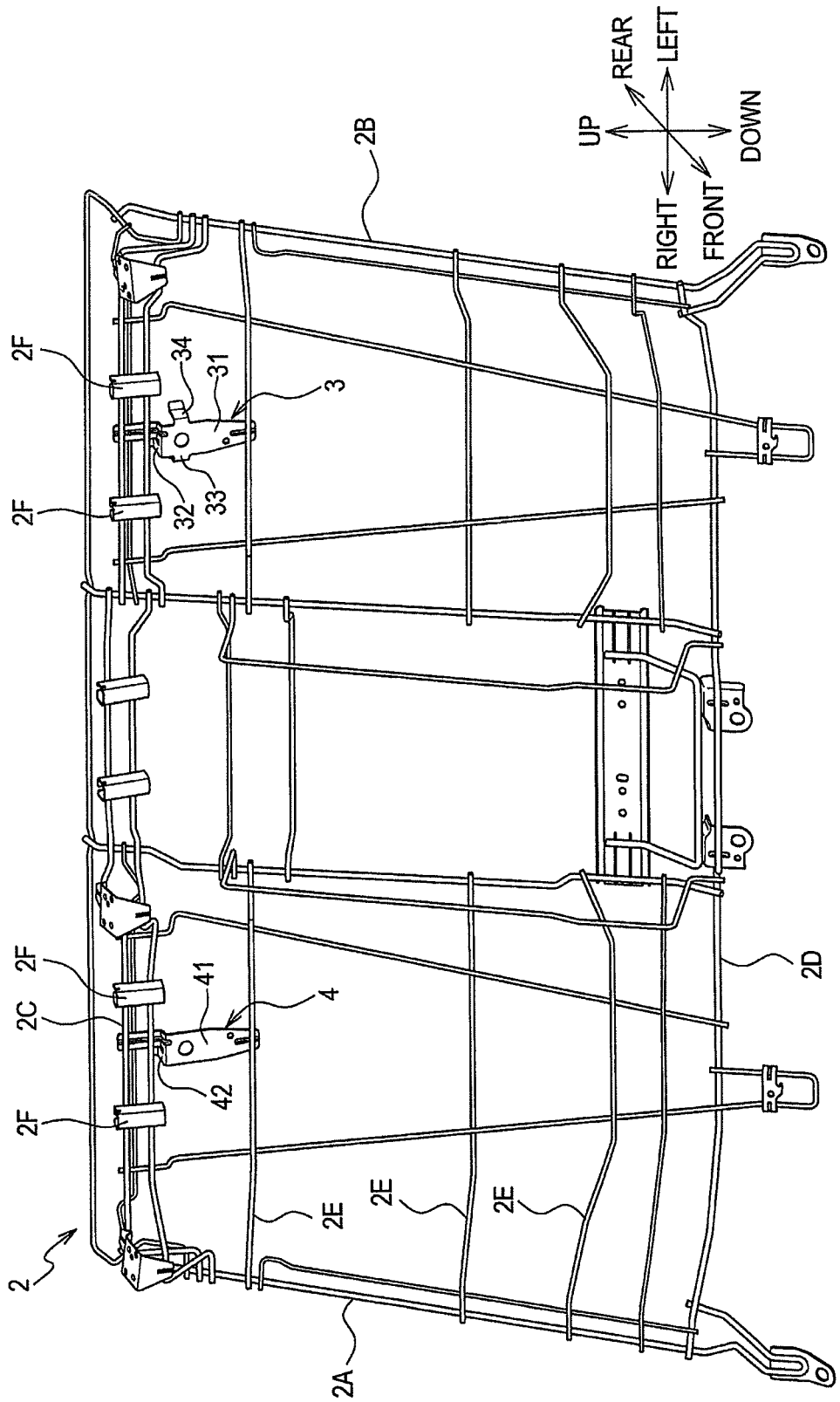
FIG. 2 is a schematic perspective view showing a back frame, seat brackets and a seat auxiliary bracket of the seatback in FIG. 1.

As shown in FIG. 2, the seatback 1 comprises a back frame 2 that forms the framework of the seatback 1, a seat bracket 3, and a seat auxiliary bracket 4. The seat bracket 3, and the seat auxiliary bracket 4 are fastened in the vertical upper portion of the back frame 2.

Figure 4:
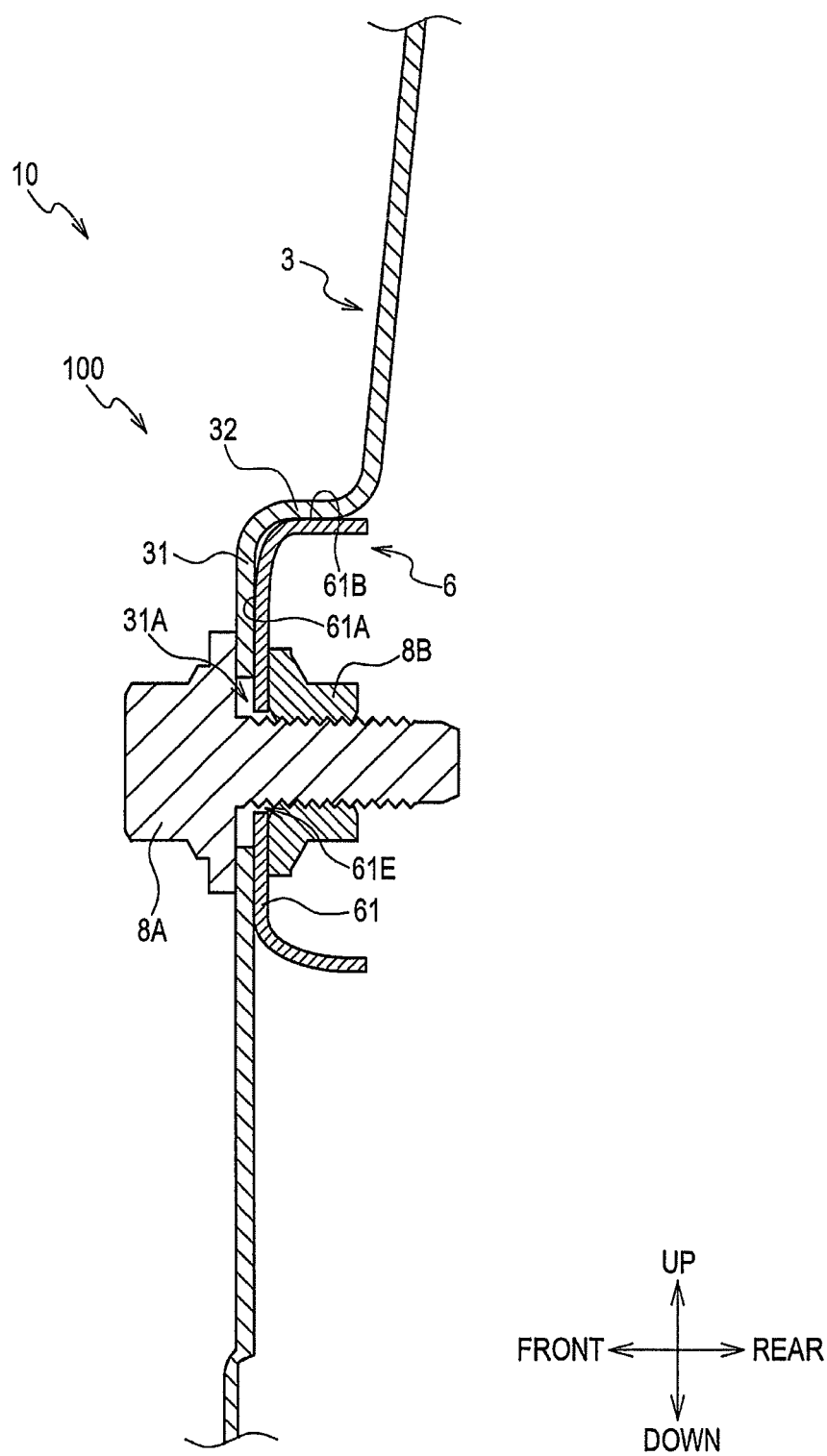
FIG. 4 is a schematic sectional view showing the seatback fastening structure and the fastening component in FIG. 3 from a direction different from that in FIG. 3.

The seatback 1 is secured to a body 5 of a vehicle with a seatback fastening structure 10 and a fastening component 100 shown in FIGS. 3 and 4. As shown in FIG. 3, a body bracket 6 is fastened to the body 5. Although not shown in the drawings, two body brackets 6 that are respectively fastened to the seat bracket 3 and the seat auxiliary bracket 4 are fastened to the body 5.

The seatback 1 according to the present embodiment is used as a seatback of a rear seat of a passenger car. The body 5 according to the present embodiment is thus a part of a car body of a standard-sized passenger car. Examples of the body 5 include a partition panel that divides a cabin and a trunk. In the following description and the drawings, the directions are defined in relation to the seatback 1 assembled in a vehicle (in other words, an automobile).

<Body Bracket>

Figures 5A, 5B:
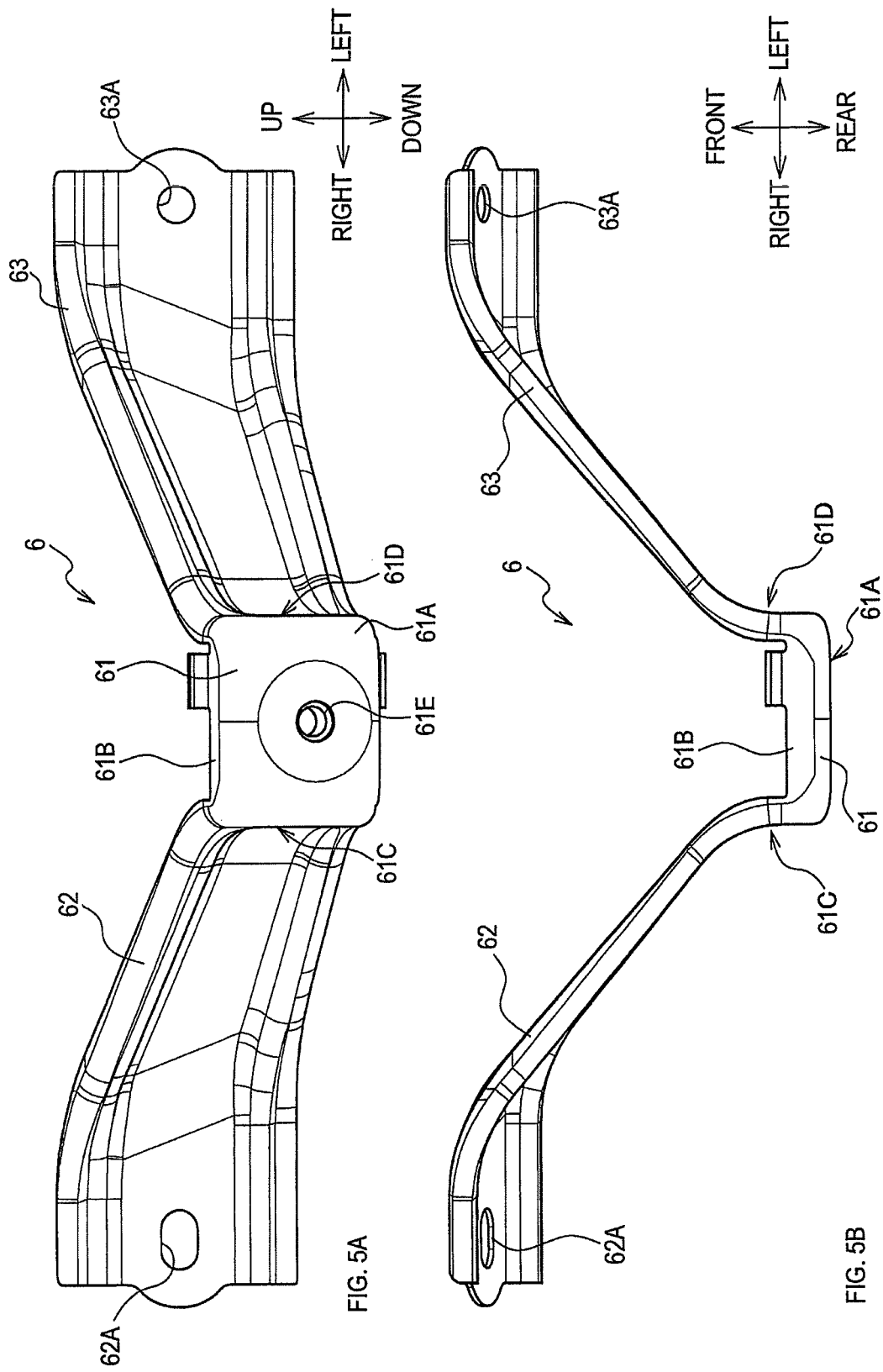
FIG. 5A is a schematic perspective view showing the body bracket of the seatback fastening structure in FIG. 3 from the front side.

As shown in FIGS. 5A and 5B, the body bracket 6 comprises a main body portion 61, a first strip portion 62, and a second strip portion 63. The body bracket 6 is formed with a sheet of pressed metal plate.

<<Main Body Portion>>

The main body portion 61 is covered by the seat bracket 3. The main body portion 61 comprises a receiving surface 61A, an upper surface 61B, a first lateral surface 61C, a second lateral surface 61D, and a bolt inserting hole 61E.

The receiving surface 61A is covered by the seat bracket 3 and disposed so as to face the seatback 1 positioned in front of the body bracket 6. The receiving surface 61A is a rectangular plane surface having its upper edge and its lower edge extending in the horizontal direction and its left edge and its right edge extending in the vertical direction. The corners of the rectangular plane surface are round chamfered.

The upper surface 61B extends from the vertical upper end of the receiving surface 61A toward the body 5 (in other words, opposite side to the seatback 1). The connecting portion of the upper surface 61B and the receiving surface 61A is curved (that is, rounded) as shown in FIG. 4.

The first lateral surface 61C extends from the left end of the receiving surface 61A in the seat width direction toward the body 5. The second lateral surface 61D extends from the right end of the receiving surface 61A in the seat width direction toward the body 5. As shown in FIG. 3, the connecting portions of the first lateral surface 61C and the receiving surface 61A, and of the second lateral surface 61D and the receiving surface 61A are curved. The seat width direction in the present embodiment corresponds to the left-right direction of the automobile.

In the present embodiment, the first lateral surface 61C and the second lateral surface 61D are vertical surfaces parallel to the front-rear direction of the automobile. The first lateral surface 61C and the second lateral surface 61D have the shapes of left-right mirror images. In other words, the first lateral surface 61C and the second lateral surface 61D have the same size in the front-rear direction and the up-down direction.

The bolt inserting hole 61E is a through-hole provided in the central area of the receiving surface 61A. As shown in FIGS. 3 and 4, the bolt inserting hole 61E allows a bolt 8A that fastens the body bracket 6 and the seat bracket 3 to pass through.

<<First Strip Portion and Second Strip Portion>>

As shown in FIGS. 5A and 5B, the first strip portion 62 is a strip-shaped plate member that faces the seatback 1 and extends in the right direction from the main body portion 61.

The left end of the first strip portion 62 is coupled to the first lateral surface 61C of the main body portion 61. The right end portion of the first strip portion 62 is provided with a bolt inserting hole 62A. The first strip portion 62 is curved such that the distance between the surface of the first strip portion 62 facing the seatback 1 and the seatback 1 increases from the left end to the right end.

As shown in FIG. 5B, the surface in the left end portion of the first strip portion 62 facing the seatback 1 is slanted relative to the receiving surface 61A of the main body portion 61 when projected on an imaginary surface perpendicular to the seat width direction (that is, when viewed from the seat width direction). In other words, the direction of a bolt 7A being inserted into the bolt inserting hole 62A of the first strip portion 62 is different from that of the bolt 8A being inserted into the bolt inserting hole 61E of the main body portion 61. FIG. 5A is a perspective view of the body bracket 6 seen from the direction parallel to the central axial of the bolt inserting hole 62A of the first strip portion 62, whereas FIG. 5B is a perspective view of the body bracket 6 seen from the direction perpendicular to the upper surface 61B.

The second strip portion 63 is a strip-shaped plate member that faces the seatback 1 and extends in the seat width direction toward the opposite side to the extension of the first strip portion 62, that is, leftward, from the main body portion 61. The second strip portion 63 is a laterally-inverted version of the first strip portion 62 turned around the main body portion 61. The second strip portion 63 is provided with a bolt inserting hole 63A in an end portion located in the opposite side to where the main body portion 61 is coupled (that is, in the left end portion).

As shown in FIG. 3, the first strip portion 62 and the second strip portion 63 are respectively fastened to the body 5 with the bolts 7A and nuts 7B. The bolt inserting hole 62A of the first strip portion 62 has an oval shape having a major axis parallel to the left-right direction. On the other hand, the bolt inserting hole 63A of the second strip portion 63 has the shape of a perfect circle. The second strip portion 63 is first fastened to the body 5 and then the first strip portion 62 is fastened to the body 5. In this way, the positional deviation of the body bracket 6 relative to the body 5 in the left-right direction can be absorbed by the bolt inserting hole 62A. As a result, the body bracket 6 can be easily attached to the body 5.

<Back Frame>

As shown in FIG. 2, the back frame 2 comprises a pair of side frames 2A, 2B, upper frames 2C, a lower frame 2D, wires 2E extending in the seat width direction, and support brackets 2F.

The side frames 2A, 2B are pipe or wire members that extend in the up-down direction and are disposed so as to be spaced apart from each other in the seat width direction.

The upper frames 2C are configured with pipe or wire members so as to extend in the seat width direction and couple the upper end portions of the side frames 2A, 2B. The lower frame 2D is a pipe or a wire member that extends in the seat width direction and couples the lower end portions of the pair of side frames 2A, 2B. The upper frames 2C and the lower frame 2D may be panel members each having a cross section orthogonal to its extending direction being formed into a C-shape or a J-shape, for example.

The support brackets 2F are members into which stays of the headrest S2 are inserted. The support brackets 2F in pairs support one headrest S2.

<Seat Bracket>

The seat bracket 3 is attached to the vertical upper portion of the back frame 2. Specifically, the seat bracket 3 is secured so as to extend from one of the upper frames 2C to one of the wires 2E located below the corresponding upper frames 2C. The seat bracket 3 is disposed between a pair of the support brackets 2F in the seat width direction.

As shown in FIGS. 6A, 6B, 6C, and 6D, the seat bracket 3 comprises a base portion 31, a retaining portion 32, a first side wall 33, and a second side wall 34. The seat bracket 3 is a single piece of a pressed metal plate.

<<Base Portion>>

As shown in FIGS. 3 and 4, the base portion 31 covers the receiving surface 61A of the body bracket 6. The base portion 31 comprises a bolt inserting hole 31A for inserting the bolt 8A that fastens the body bracket 6 and the seat bracket 3.

When the base portion 31 covers the receiving surface 61A, the back surface of the base portion 31 abuts on the receiving surface 61A. The length of the base portion 31 in the seat width direction is substantially the same as that of the main body portion 61 of the body bracket 6 in the seat width direction. The bolt inserting hole 31A is positioned such that, when the base portion 31 covers the receiving surface 61A, the bolt inserting hole 31A aligns with the bolt inserting hole 61E of the main body portion 61.

<<Retaining Portion>>

The retaining portion 32 is configured such that the retaining portion 32 can retain the upper surface 61B of the main body portion 61 from vertically above. Specifically, the retaining portion 32 extends from the upper end of the base portion 31 toward the body 5. As shown in FIG. 4, the lower surface of the retaining portion 32 abuts on the upper surface 61B of the main body portion 61. In a state wherein the retaining portion 32 abuts on the upper surface 61B, the retaining portion 32, due to gravity, retains the upper surface 61B. The retaining portion 32 thus restricts the vertical movement of the seat bracket 3 before the seat bracket 3 is fastened.

As shown in FIGS. 6B, 6C, and 6D, the retaining portion 32 comprises a planar guide portion 32A at the tip located toward the body 5 such that the planar guide portion 32A is away from the base portion 31 in the upward direction. Specifically, the planar guide portion 32A is made by upwardly bending the tip of the retaining portion 32 located toward the body 5. The guide portion 32A does not abut on the upper surface 61B.

The connecting portion between the retaining portion 32 and the base portion 31 (hereinafter also referred to as a "first connecting portion") is curved. As shown in FIG. 4, the radius of curvature of the first connecting portion is larger than that of the connecting portion between the receiving surface 61A of the main body portion 61 and the upper surface 61B (hereinafter also referred to as a "second connecting portion"). The first connecting portion and the second connecting portion are thus spaced apart. This structure allows reliable abutment of the retaining portion 32 on the upper surface 61B.

<<First Side Wall and Second Side Wall>>

When the base portion 31 covers the receiving surface 61A, the first side wall 33 abuts on the first lateral surface 61C of the main body portion 61.

Specifically, the first side wall 33 extends from the left end of the base portion 31 toward the body 5. As shown in FIG. 3, the inner surface the first side wall 33 (that is, the surface that faces the second side wall 34 before the seat bracket 3 is placed over the body bracket 6) abuts on the first lateral surface 61C.

As shown in FIG. 6D, the first side wall 33 comprises a planar guide portion 33A at the tip located toward the body 5 such that the planar guide portion 33A is away from the base portion 31 in the right direction. Specifically, the planar guide portion 33A is made by bending the tip of the first side wall 33 located toward the body 5 in the right direction. As shown in FIG. 3, the guide portion 33A does not abut on the first lateral surface 61C.

When the base portion 31 covers the receiving surface 61A, the second side wall 34 abuts on the second lateral surface 61D of the main body portion 61. The second side wall 34 is a laterally-inverted version of the first side wall 33 turned around the base portion 31. The first side wall 33 and the second side wall 34 restrict the movement of the seat bracket 3 in the seat width direction before the seat bracket 3 is fastened.

The second side wall 34 comprises a planar guide portion 34A at the tip located toward the body 5 such that the planar guide portion 34A is away from the base portion 31 in the left direction. That is, the distance between the first side wall 33 and the second side wall 34 is, as shown in FIG. 3, constant in the area wherein the first side wall 33 and the second side wall 34 abut on the main body portion 61, and becomes longer toward the body 5 in the tip areas of the first side wall 33 and the second side wall 34 wherein the guide portions 33A, 34A are provided.

The connecting portion between the first side wall 33 and the base portion 31 and the connecting portion between the second side wall 34 and the base portion 31 (hereinafter the both also referred to as "third connecting portions") are curved. As shown in FIG. 3, the radii of curvature of the third connecting portions are larger than that of the connecting portion of the receiving surface 61A of the main body portion 61 and the first lateral surface 61C, or that of the connecting portion of the receiving surface 61A of the main body portion 61 and the second lateral surface 61D (hereinafter also referred to as "fourth connecting portions"). The third connecting portions and the fourth connecting portions are thus spaced apart. This structure allows the first side wall 33 and the second side wall 34 to reliably abut on the first lateral surface 61C and the second lateral surface 61D respectively.

<Seat Auxiliary Bracket>

As shown in FIG. 2, the seat auxiliary bracket 4 is attached to the vertical upper portion of the back frame 2 so as to be spaced apart from the seat bracket 3 in the seat width direction.

The seat auxiliary bracket 4 is secured, in the same manner as the seat bracket 3, so as to extend from one of the upper frames 2C to one of the wires 2E located below the corresponding upper frames 2C. The seat auxiliary bracket 4 is disposed between a pair of the support brackets 2F that are different from the ones for the seat bracket 3.

As shown in FIG. 2, the seat auxiliary bracket 4 comprises a base portion 41 and a retaining portion 42. Since the base portion 41 and the retaining portion 42 are configured in the same manner as the base portion 31 and the retaining portion 32 of the seat bracket 3, the description thereof is not repeated here. The seat auxiliary bracket 4 does not have side walls that correspond to the first side wall 33 and the second side wall 34 of the seat bracket 3.

That is, the seat auxiliary bracket 4 is a simplified version of the seat bracket 3 and configured by removing the first side wall 33 and the second side wall 34 from the seat bracket 3. The seat auxiliary bracket 4 is fastened to one body bracket 6. The seat auxiliary bracket 4 is configured to be movable in the seat width direction while the base portion 41 covers the receiving surface 61A of the body bracket 6 and the retaining portion 42 retains the upper surface 61B of the body bracket 6.

<Seatback Fastening Structure>

As shown in FIGS. 3 and 4, in the seatback fastening structure 10 according to the present embodiment, the seatback 1 is fastened to the body 5.

In the seatback fastening structure 10, the seat bracket 3 is fasten to the corresponding body bracket 6 with the bolt 8A and the nut 8B, and thus the back frame 2 of the seatback 1 is fastened to the body 5. Although not shown in the drawing, the seat auxiliary bracket 4 is also fastened to the corresponding body bracket 6.

<Fastening Component>

The fastening component 100 according to the present embodiment is configured to secure the seatback 1 to the body 5. As shown in FIGS. 3 and 4, the fastening component 100 comprises the seat bracket 3, the body bracket 6, the bolt 8A, and the nut 8B. The fastening component 100 may comprise the seat auxiliary bracket 4 shown in FIG. 2.

As described above, the seat bracket 3 and the body bracket 6 are configured to be placed together such that their bolt inserting holes 31A and 61E are aligned and to be fastened with the bolt 8A and the nut 8B. In this way, the seatback 1 is secured to the body 5.

[1-2. Effect]

In the above-described embodiment, the following effect can be achieved.

(1a) The retaining portion 32, the first side wall 33, and the second side wall 34 of the seat bracket 3 serve as guides in the up-down direction and the left-right direction when the seat bracket 3 is assembled with the body bracket 6. This structure allows easier positioning of the seat bracket 3 and the body bracket 6 relative to each other even if a worker does not have a good view of the seat bracket 3 and the body bracket 6, which in turn improves the efficiency in installing the seatback 1.

(1b) The first side wall 33 and the second side wall 34 respectively comprise the planar guide portions 33A, 34A at the tips located toward the body 5 such that the planar guide portions 33A, 34A are away from the base portion 31 in the seat width direction. This structure allows easier positioning of the seat bracket 3 relative to the body bracket 6.

(1c) Among the brackets attached to the body bracket 6, only the seat bracket 3 comprises guides for positioning in the left-right direction. The seat auxiliary bracket 4 does not have any guide for positioning in the left-right direction. This structure allows easier positioning of the seat bracket 3 in the left-right direction.

The position of the seat auxiliary bracket 4 in the left-right direction is automatically determined in association with the positioning of the seat bracket 3 in the left-right direction, which further improves the efficiency in installing the seatback 1.

2. Other Embodiments

The above has described an embodiment of the present disclosure. The present disclosure, however, is not limited to the aforementioned embodiment and may be carried out in various forms.

(2a) The shapes of the seat bracket 3 and the body bracket 6 in the seatback 1, the seatback fastening structure 10, and the fastening component 100 according to the aforementioned embodiment are merely an example. In other words, the seat bracket 3 is only required to comprise the base portion 31 that covers the receiving surface 61A, the retaining portion 32 that is configured to be able to retain the upper surface 61B, and the first side wall 33 and the second side wall 34 that are respectively abut on the first lateral surface 61C and the second lateral surface 61D. The shape of the seat bracket 3 is not limited to the one described above. The retaining portion 32, the first side wall 33, and the second side wall 34 may be formed, for example, without the guide portions 32A, 33A, and 34A respectively.

The body bracket 6 is only required to comprise the main body portion 61 that is covered by the seat bracket 3, but its shape is not limited to the one described above. The body bracket 6 may be formed without the first strip portion 62 and the second strip portion 63.

(2b) The seatback 1, the seatback fastening structure 10, and the fastening component 100 according to the aforementioned embodiment are only required to comprise at least one seat bracket 3 and at least one body bracket 6, but does not have to include the seat auxiliary bracket 4. Moreover, the seatback 1, the seatback fastening structure 10, and the fastening component 100 may be configured without the seat auxiliary bracket 4, and may alternatively comprise several seat brackets 3. Contrarily, the seatback 1, the seatback fastening structure 10, and the fastening component 100 may comprise several seat auxiliary brackets 4 in addition to a single seat bracket 3.

(2c) The seatback 1, the seatback fastening structure 10, and the fastening component 100 according to the aforementioned embodiment may be used for seats for automobiles other than passenger cars, or used for seats for vehicles other than automobiles such as railroad vehicles, ships, boats, and aircrafts.

(2d) A single function or several functions possessed by a single component in the above-described embodiments may be distributed to several components; a single function or several functions possessed by several components may be integrated and assigned to a single component. A part of the configurations of the above-described embodiments may be omitted. At least a part of the configurations of the above-described embodiments may be added to or altered with the configurations of other embodiments. Various aspects included in the technical ideas specified only by the languages recited in the claims correspond to the embodiments of the present disclosure.

What is claimed is:

1. A seatback fastening structure for fastening a seatback to a body of a vehicle, the structure comprising:
   at least one body bracket fastened to the body; and
   at least one seat bracket having a planar shape and fastened to a vertical upper portion of a back frame forming a framework of the seatback,
   wherein the at least one body bracket comprises:
   a main body portion covered by the at least one seat bracket, the main body portion comprising:
       a receiving surface facing the seatback;
       an upper surface extending from a vertical upper end of the receiving surface toward the body; and
       a first lateral surface and a second lateral surface extending from both ends of the receiving surface in a width direction of the seatback toward the body,
   wherein the at least one seat bracket comprises:
   a base portion covering the receiving surface of the main body portion;
   a retaining portion retaining the upper surface of the main body portion from vertically above;
   a first side wall abutting on the first lateral surface of the main body portion while the base portion covers the receiving surface; and
   a second side wall abutting on the second lateral surface of the main body portion while the base portion covers the receiving surface, and
   wherein the main body portion and the base portion are fastened with a bolt penetrating the main body portion and the base portion.

2. The seatback fastening structure according to claim 1, wherein the first side wall and the second side wall respectively comprise planar guide portions at tips located toward the body such that the planar guide portions are away from the base portion in the width direction of the seatback.

3. The seatback fastening structure according to claim 1, wherein the at least one body bracket fastened to the body is at least two body brackets,
   wherein at least one seat auxiliary bracket is fastened to the vertical upper portion of the back frame in addition to the at least one seat bracket,
   wherein the at least one seat auxiliary bracket comprises:
   a base portion covering the receiving surface of the main body portion; and
   a retaining portion retaining the upper surface of the main body portion from vertically above, and
   wherein the at least one seat auxiliary bracket is configured to be movable in the width direction of the seatback while the retaining portion of the at least one seat auxiliary bracket retains an upper surface of one of the at least two body brackets.

4. A seatback configured to be secured to a body of a vehicle to which at least one body bracket is fastened, the seatback comprising:
   at least one seat bracket configured to be fastened to a vertical upper portion of a back frame forming a framework of the seatback, the at least one seat bracket comprising:
       a base portion configured to cover a receiving surface of the at least one body bracket facing the seatback, the base portion comprising a bolt inserting hole configured to be in communication with a bolt inserting hole of the receiving surface while the base portion covers the receiving surface;
a retaining portion configured to retain an upper surface of the at least one body bracket from vertically above, the upper surface extending from a vertical upper end of the receiving surface toward the body;
a first side wall configured to abut on a first lateral surface of the at least one body bracket while the base portion covers the receiving surface, the first lateral surface extending from a first end of the receiving surface in the width direction of the seatback toward the body; and
a second side wall configured to abut on a second lateral surface of the at least one body bracket while the base portion covers the receiving surface, the second lateral surface extending from a second end of the receiving surface in the width direction of the seatback toward the body.

5. A fastening component for fastening a seatback to a body of a vehicle, the component comprising:
at least one body bracket configured to be fastened to the body; and
at least one seat bracket configured to be fastened to a vertical upper portion of a back frame forming a framework of the seatback,
wherein the at least one body bracket comprising:
a main body portion configured to be covered by a seat bracket, the main body portion comprising:
a receiving surface configured to face the seatback, the receiving surface comprising a bolt inserting hole;
an upper surface extending from a vertical upper end of the receiving surface toward the body; and
a first lateral surface and a second lateral surface extending from both ends of the receiving surface in a width direction of the seatback toward the body; and
wherein the at least one seat bracket comprises:
a base portion configured to cover the receiving surface of the main body portion, the base portion comprising a bolt inserting hole configured to be in communication with the bolt inserting hole of the receiving surface while the base portion covers the receiving surface;
a retaining portion configured to retain the upper surface of the main body portion from vertically above;
a first side wall configured to abut on the first lateral surface of the main body portion while the base portion covers the receiving surface; and
a second side wall configured to abut on the second lateral surface of the main body portion while the base portion covers the receiving surface.

* * * * *